US010386455B2

(12) United States Patent
Wakana et al.

(10) Patent No.: US 10,386,455 B2
(45) Date of Patent: Aug. 20, 2019

(54) POSITION DETECTION SYSTEM

(71) Applicant: ALPS ALPINE CO., LTD., Tokyo (JP)

(72) Inventors: Keigo Wakana, Miyagi (JP); Daisuke Takai, Miyagi (JP); Yukimitsu Yamada, Miyagi (JP); Toshiki Nakamura, Miyagi (JP); Hironori Takayama, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/127,613

(22) Filed: Sep. 11, 2018

(65) Prior Publication Data

US 2019/0011527 A1    Jan. 10, 2019

Related U.S. Application Data

(63) Continuation of application No. PCT/JP2017/002398, filed on Jan. 24, 2017.

(30) Foreign Application Priority Data

Mar. 16, 2016  (JP) ................................. 2016-052596

(51) Int. Cl.
*H04W 64/00*   (2009.01)
*G01S 5/14*    (2006.01)
*G01S 5/02*    (2010.01)

(52) U.S. Cl.
CPC .............. *G01S 5/14* (2013.01); *G01S 5/0215* (2013.01); *G01S 5/0252* (2013.01); *G01S 5/0284* (2013.01)

(58) Field of Classification Search
CPC .................................. G01S 5/14; H04W 64/00
See application file for complete search history.

(56) References Cited

U.S. PATENT DOCUMENTS 6,009,334 A    12/1999 Grubeck et al.
6,009,344 A *  12/1999 Grubeck ................ H04M 11/00
(Continued)

FOREIGN PATENT DOCUMENTS

JP    2001-524790    12/2001
JP    2004-215258     7/2004
(Continued)

OTHER PUBLICATIONS

International Search Report dated Apr. 4, 2017 in PCT/JP2017/002398 filed on Jan. 24, 2017.
(Continued)

*Primary Examiner* — Myron Wyche
(74) *Attorney, Agent, or Firm* — IPUSA, PLLC

(57) ABSTRACT

A position detection system performs first through third processes to measure, using high-frequency signals, a position of a slave device in a measurement area surrounded by parent devices. The first process measures distances between the slave device and each of the master devices a plurality of times, to obtain a minimum value of each of the distances. The second process obtains a position of an intersection point of two arcs among arcs respectively having the minimum value of each of the distances as a radius from respective centers of the master devices when a number of intersection points of the two arcs within the measurement area is one. The third process regards a center of gravity of the intersection points as a true position of the slave device when the intersection points are densely arranged.

8 Claims, 12 Drawing Sheets

(56) References Cited

U.S. PATENT DOCUMENTS

2004/0203904 A1    10/2004    Gwon et al.
2010/0167758 A1    7/2010    Mukai et al.

FOREIGN PATENT DOCUMENTS

| JP | 2006-300918 | | 11/2006 | | |
|----|-------------|---|---------|---|---|
| JP | 2009-216474 | | 9/2009 | | |
| JP | 2009-243988 | | 10/2009 | | |
| JP | 2010-151807 | | 7/2010 | | |
| JP | 2011-099809 | | 5/2011 | | |
| JP | 2011-099899 | * | 5/2011 | ............ | H04W 64/00 |
| JP | 2011-215001 | | 10/2011 | | |
| JP | 2013-195356 | | 9/2013 | | |
| JP | 2014-169908 | | 9/2014 | | |

OTHER PUBLICATIONS

Extended European Search Report for 17766059.4 dated Feb. 27, 2019.

\* cited by examiner

POSITION DETECTION SYSTEM

CROSS-REFERENCE TO RELATED APPLICATION

This application is a continuation application of International Application No. PCT/JP2017/002398 filed on Jan. 24, 2017 and designated the U.S., which is based upon and claims the benefit of priority of the prior Japanese Patent Application No. 2016-052596, filed on Mar. 16, 2016, the entire contents of which are incorporated herein by reference.

BACKGROUND OF THE INVENTION

1. Field of the Invention

The present invention relates to a position detection system that detects a position of a moving object, such as automobiles, cargo, stock within warehouses, people, or the like, for example.

2. Description of the Related Art

A monitoring system described in Japanese Laid-Open Patent Publication No. 2014-169908 has a plurality of slave monitoring devices, and a master monitoring device. The plurality of slave monitoring devices transmit radio signals. On the other hand, the master monitoring device receives the radio signals transmitted from the plurality of slave monitoring devices.

In the monitoring system described in Japanese Laid-Open Patent Publication No. 2014-169908, transmission areas of the radio signals transmitted from the plurality of slave monitoring devices include a set-up position of the master monitoring device, and the transmission areas are mutually different among the plurality of slave monitoring devices. The plurality of slave monitoring devices transmit the radio signals having mutually different frequencies. In addition, the master monitoring device receives the radio signals transmitted from each of the slave monitoring devices, and based on each of the radio signals received, computes a spatial feature of each of the radio signals, to monitor a movement of a person in the transmission area corresponding to the radio signal based on the computed spatial feature.

According to the monitoring system described in Japanese Laid-Open Patent Publication No. 2014-169908, the transmission area of the radio signal can be identified from the frequency of the radio signal that is used to monitor the movement of the person, and for this reason, it is possible to identify a location of the person within a detection target area.

In order to measure the position of the person within the detection target area, it is necessary to measure distances between the master monitoring device and the plurality of slave monitoring devices. In a case in which the distances between the master monitoring device and the plurality of slave monitoring devices are measured using high-frequency signals (RF signals), the distance measurements are affected by multipath. For this reason, there is a problem in that an accuracy of measuring the distances between the master monitoring device and each of the plurality of slave monitoring devices is poor.

SUMMARY OF THE INVENTION

Accordingly, it is an object in one aspect of the embodiments to provide a position detection system that can measure the distance between the master device and the slave device and measure the position of the slave device with a high accuracy, even when the high-frequency signal is used for the measurement.

According to one aspect of the embodiments, a position detection system includes a plurality of master devices surrounding a measurement area; and a slave device located inside the measurement area, wherein the plurality of master devices measure a position of the slave device using high-frequency signals, by executing a process including a first process that measures distances between the slave device and each of the plurality of master devices a plurality of times, to obtain a minimum value of each of the distances; a second process that obtains a position of an intersection point of two arcs among a plurality of arcs respectively having the minimum value of each of the distances as a radius from respective centers of the plurality of master devices when a number of intersection points of the two arcs within the measurement area is one; and a third process that regards a center of gravity of the plurality of intersection points as a true position of the slave device when the plurality of intersection points are densely arranged and distances among the plurality of intersection points are less than a predetermined value.

Other objects and further features of the present invention will be apparent from the following detailed description when read in conjunction with the accompanying drawings.

DESCRIPTION OF THE PREFERRED EMBODIMENTS

Figure 1:
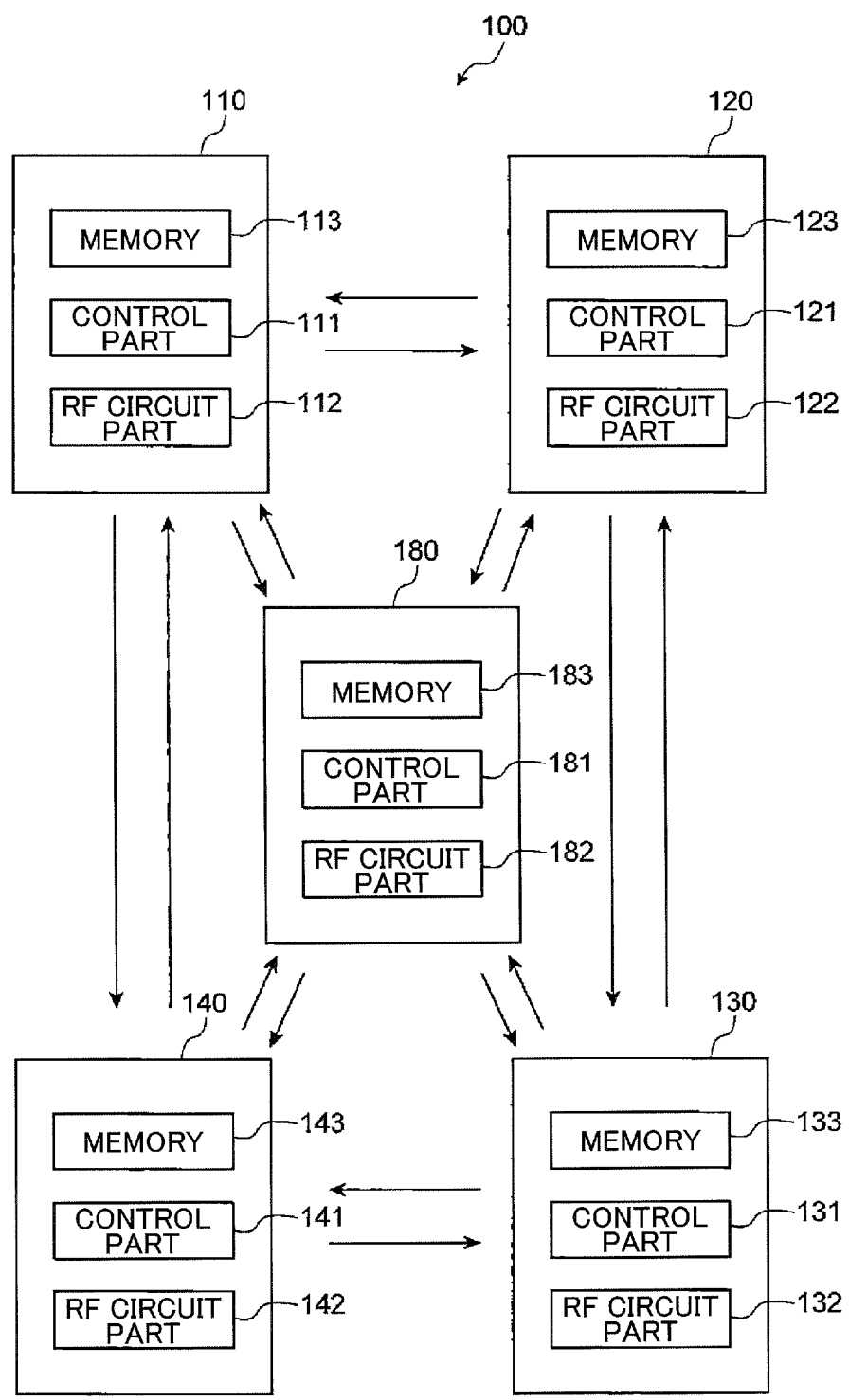
FIG. 1 is a block diagram illustrating a position detection system in one embodiment of the present invention.

Embodiments of the present invention will be described by referring to the drawings. In the drawings, the same constituent elements are designated by the same reference numerals, and a detailed description of the same parts will be omitted, where appropriate.

As will be described later in more detail, according to the position detection system in one embodiment of the present invention, a process is executed to measure the distances between the slave device and each of the plurality of master devices a plurality of times, to obtain a minimum value of each of the measured distances between the slave device and the plurality of master devices. Hence, distance data affected by the multipath can be excluded, to estimate true values of the distances. Next, a process that obtains a position of an intersection point of two arcs among a plurality of arcs respectively having the minimum value of each of the distances as a radius from respective centers of the plurality of master devices is executed when a number of intersection points of the two arcs within the measurement area is one. Next, a process is executed to regard a center of gravity of the plurality of intersection points as a true position of the slave device when distances among the plurality of intersection points are less than a predetermined value.

The position of the intersection point of the two arcs is obtained when the number of intersection points of the two arcs within the measurement area is one. In a case in which the distances among the plurality of intersection points is less than a predetermined value, it may be regarded that the plurality of intersection points are densely arranged. In this case, the center of gravity of the plurality of intersection points is regarded as the true position of the slave device. Hence, even high-frequency signals are used, it is possible to measure, with a high accuracy, the distances between the slave device and the plurality of master devices, and the position of the slave device.

FIG. 1 is a block diagram illustrating a position detection system in one embodiment of the present invention.

Figure 2:
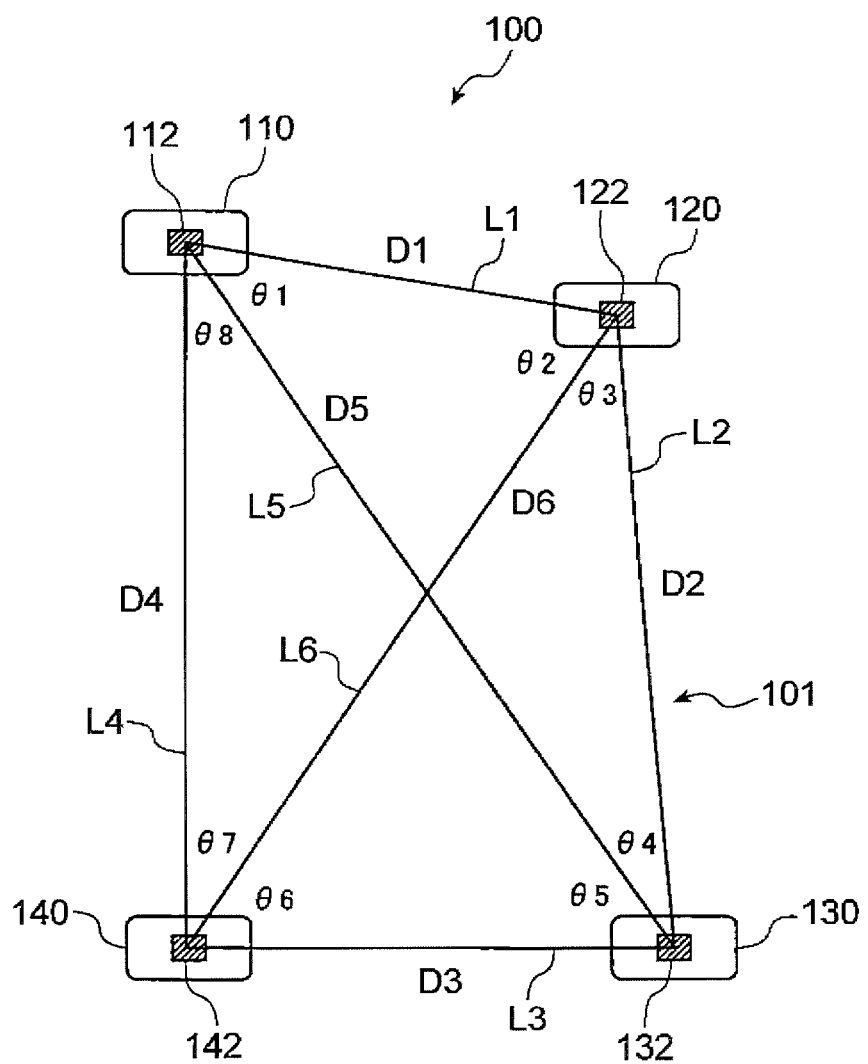
FIG. 2 is a plan view illustrating an example of an arrangement of the position detection system in one embodiment.

FIG. 2 is a plan view illustrating an example of an arrangement of the position detection system in one embodiment. In FIG. 2, illustration of a slave device 180 is omitted for the sake of convenience.

A position detection system 100 in one embodiment includes a plurality of master devices 110, 120, 130, and 140, and the slave device 180. The master device is arranged in at least three locations. This embodiment is described for a case in which the four master devices 110, 120, 130, and 140 are arranged. However, the number of master devices that are set up is not limited to four, and five or more master devices may be set up.

As illustrated in FIG. 2, the plurality of master devices 110, 120, 130, and 140 are arranged to be separated from each other, and are fixed to a fixed structure, such as a pillar, a wall, or the like, for example. For this reason, the plurality of master devices 110, 120, 130, and 140 do not move. The plurality of master devices 110, 120, 130, and 140 form a measurement area 101, and surround the measurement area 101.

The slave device 180 is located inside the measurement area 101, and is mounted on a moving object, such as automobiles, cargo, stock within warehouses, people, or the like, for example. The moving object is an object whose movement is to be measured, or an object whose location is to be measured. An example of the slave device 180 is an electronic tag or the like. For example, in a case in which the moving object is a person, the slave device 180 is carried by the person in the form of a card or portable device having the slave device 180 (for example, the electronic tag) built into the card or portable device. The position detection system 100 in this embodiment measures the position of the slave device 180, to detect the position of the moving object.

As illustrated in FIG. 1, the first master device 110 includes a control part 111, a high-frequency circuit part (RF circuit part) 112, and a memory 113. The RF circuit part 112 includes a transmitter and receiver capable of transmitting and receiving high-frequency signals (RF signals) (for example, signals having high frequencies of 10 kilohertz (kHz) or higher). Hence, the RF circuit part 112 corresponds to a transmitter and receiver in one embodiment of the present invention. The control part 111 controls an operation of the RF circuit part 112, and can execute processes which will be described later. One or more programs required for executing the processes are stored in the memory 113. In addition, results of the processes are stored in the memory 113. The control part 111 may be formed by a processor, such as a CPU (Central Processing Unit), that executes the one or more programs stored in the memory 113 to perform the processes which will be described later.

As illustrated in FIG. 1, the second master device 120 includes a control part 121, a RF circuit part 122, and a memory 123. The third master device 130 includes a control part 131, a RF circuit part 132, and a memory 133. The fourth master device 140 includes a control part 141, a RF circuit part 142, and a memory 143. The slave device 180 includes a control part 181, a RF circuit part 182, and a memory 183.

The control parts 121, 131, 141, and 181 are similar to the control part 111 of the first master device 110. The RF circuit parts 122, 132, 142, and 182 are similar to the RF circuit part 112 of the first master device 110. The memories 123, 133, 143, and 183 are similar to the memory 113 of the first master device 110. Hence, a detailed description of the control parts 121, 131, 141, and 181, the RF circuit parts 122, 132, 142, and 182, and the memories 123, 133, 143, and 183 will be omitted.

The RF circuit part 112 of the first master device 110 transmits a measurement signal for measuring a distance D1 (refer to FIG. 2) between the RF circuit part 112 of the first master device 110 and the RF circuit part 122 of the second master device 120. The measurement signal is stored in the memory 113, and is transmitted from the RF circuit part 112 based on a control signal transmitted from the control part 111.

When the RF circuit part 122 of the second master device 120 receives the measurement signal transmitted from the RF circuit part 112 of the first master device 110, the control part 121 of the second master device 120 measures an intensity of the measurement signal received by the RF circuit part 122 of the second master device 120. The control part 121 controls the RF circuit part 122 to transmit a measurement result of the measurement signal as a response signal.

When the RF circuit part 112 of the first master device 110 receives the response signal transmitted from the RF circuit part 122 of the second master device 120, the control part 111 of the first master device 110 computes the distance D1 between the RF circuit part 112 of the first master device 110 and the RF circuit part 122 of the second master device 120, based on the response signal received by the RF circuit part 112 of the first master device 110. The RF circuit part 112 of the first master device 110 and the RF circuit part 122 of the second master device 120 form a distance sensor, and can measure the distance D1 therebetween.

As another method of computing the distance D1, the control part 111 of the first master device 110 may measure a phase difference or a time difference between the measurement signal transmitted from the RF circuit part 112 of the first master device 110 and the response signal received by the RF circuit part 112 of the first master device 110, to computer the distance D1 from the phase difference or the time difference.

The RF circuit part 132 of the third master device 130 and the RF circuit part 142 of the fourth master device 140 operate similarly to the RF circuit part 112 of the first master device 110 and the RF circuit part 122 of the second master device 120. In other words, the RF circuit part 122 of the second master device 120 and the RF circuit part 132 of the third master device 130 form a distance sensor, and can measure the distance D2 therebetween. The RF circuit part 132 of the third master device 130 and the RF circuit part 142 of the fourth master device 140 form a distance sensor, and can measure the distance D3 therebetween. The RE circuit part 112 of the first master device 110 and the RF circuit part 142 of the fourth master device 140 form a distance sensor, and can measure the distance D4 therebetween. The RF circuit part 112 of the first master device 110 and the RF circuit part 132 of the third master device 130 form a distance sensor, and can measure the distance D5 therebetween. The RF circuit part 122 of the second master device 120 and the RF circuit part 142 of the fourth master device 140 form a distance sensor, and can measure the distance D6 therebetween.

In addition, the RF circuit part 112 of the first master device 110 transmits a measurement signal for measuring a distance D11 (refer to FIG. 6) between the RF circuit part 112 of the first master device 110 and the RF circuit part 182 of the slave device 180. When the RF circuit part 182 of the slave device 180 receives the measurement signal transmitted from the RF circuit part 112 of the first master device 110, the control part 181 of the slave device 180 measures an intensity of the measurement signal received by the RF circuit part 182 of the slave device 180. The control part 181 controls the RF circuit part 182 to transmit a measurement result of the measurement signal as a response signal.

When the RF circuit part 112 of the first master device 110 receives the response signal transmitted from the RF circuit part 182 of the slave device 180, the control part 111 of the first master device 110 computes the distance D11 between the RF circuit part 112 of the first master device 110 and the RF circuit part 182 of the slave device 180, based on the response signal received by the RF circuit part 112 of the first master device 110. The RF circuit part 112 of the first master device 110 and the RF circuit part 182 of the slave device 180 form a distance sensor, and can measure the distance D11 therebetween.

In this case, the control part 111 of the first master device 110 may measure the phase difference or the time difference between the measurement signal and the response signal, to computer the distance D11 from the phase difference or the time difference.

The RF circuit part 122 of the second master device 120, the RF circuit part 132 of the third master device 130, and the RF circuit part 142 of the fourth master device 140 operate similarly to the RF circuit part 112 of the first master device 110, with respect to the RF circuit part 182 of the slave device 180. In other words, the RF circuit part 122 of the second master device 120 and the RF circuit part 182 of the slave device 180 form a distance sensor, and can measure a distance D12 therebetween (refer to FIG. 6). The RF circuit part 132 of the third master device 130 and the RF circuit part 182 of the slave device 180 form a distance sensor, and can measure a distance D13 therebetween (refer to FIG. 6). The RF circuit part 142 of the fourth master device 140 and the RF circuit part 182 of the slave device 180 foam a distance sensor, and can measure a distance D14 therebetween (refer to FIG. 6).

The position detection system 100 needs to measure the distance D11, the distance D12, the distance D13, and the distance D14 in order to measure the position of the slave device 180. In order to measure the distance D11, the distance D12, the distance D13, and the distance D14, it is necessary to know in advance the position coordinates of each of the RF circuit parts 112, 122, 132, and 142. For example, a person may use a tape measure or the like to manually measure the respective position coordinates of the RF circuit parts 112, 122, 132, and 142. However, in a case in which the distances among the RF circuit parts 112, 122, 132, and 142 are relatively long, or in a case in which the number of master devices is relatively large, the manual measurement of the position coordinates of the RF circuit parts has a poor measurement efficiency and may require considerable time to perform the measurement.

On the other hand, according to the position detection system 100 in this embodiment, the distances among the plurality of RF circuit parts 112, 122, 132, and 142 are measured, to measure the respective position coordinates of the plurality of RF circuit parts 112, 122, 132, and 142. The distances among the plurality of RF circuit parts 112, 122, 132, and 142 do not need to be manually measured by a person, and may be measured automatically. For this reason, the distances among the plurality of RF circuit parts 112, 122, 132, and 142 can be measured efficiently. Hence, the position coordinates of the plurality of RF circuit parts 112, 122, 132, and 142 can be measured efficiently.

A further description will be given of the above process, by referring to the drawings.

Figure 3:
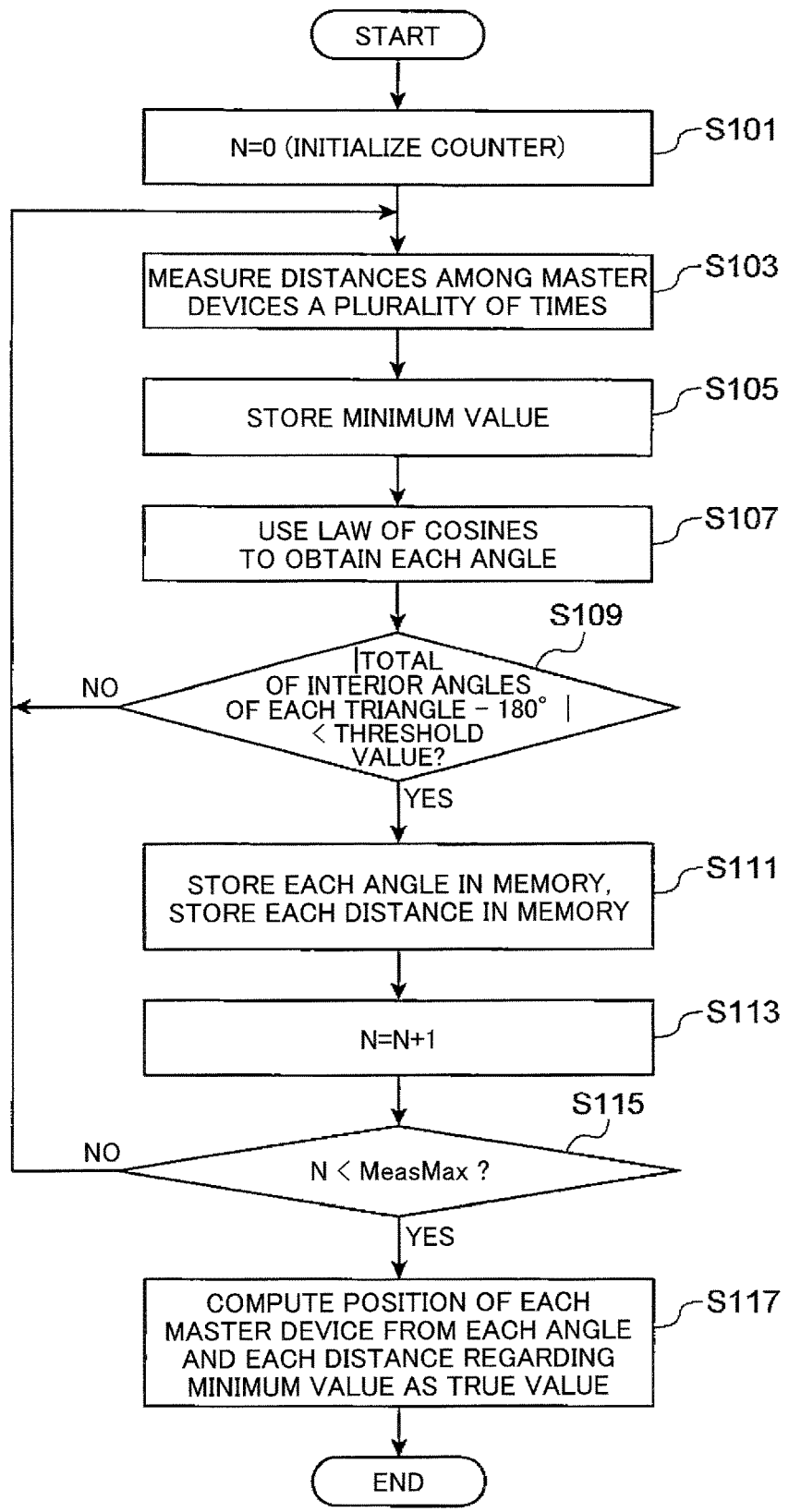
FIG. 3 is a flow chart illustrating a process executed by the position detection system in one embodiment.

FIG. 3 is a flow chart illustrating a process executed by the position detection system in one embodiment.

First, a process is executed to initialize a counter to "N=0" (step S101). Next, a process is executed to measure the distances among the plurality of RF circuit parts 112, 122, 132, and 142 a plurality of times (step S103). In other words, the RF circuit part 112 and the RF circuit part 122 measure the distance D1 therebetween a plurality of times. The RF circuit part 122 and the RF circuit part 132 measure the distance D2 therebetween a plurality of times. The RF circuit part 132 and the RF circuit part 142 measure the distance D3 therebetween a plurality of times. The RF circuit part 112 and the RF circuit part 142 measure the distance D4 therebetween a plurality of times. The RF circuit part 112 and the RF circuit part 132 measure the distance D5 therebetween a plurality of times. The RF circuit part 122 and the RF circuit part 142 measure the distance D6 therebetween a plurality of times.

Next, a process is executed to obtain a shortest distance (minimum value) of each of the distances D1, D2, D3, D4, D5, and D6 that are measured a plurality of times (step S105). In other words, the process is executed to obtain a minimum value D1$m$ among the distances D1 that are measured a plurality of times. The process is executed to obtain a minimum value D2$m$ among the distances D2 that are measured a plurality of times. The process is executed to obtain a minimum value D3$m$ among the distances D3 that are measured a plurality of times. The process is executed to obtain a minimum value D4$m$ among the distances D4 that are measured a plurality of times. The process is executed to obtain a minimum value D5$m$ among the distances D5 that are measured a plurality of times. The process is executed to obtain a minimum value D6$m$ among the distances D6 that are measured a plurality of times. By obtaining the minimum values D1$m$, D2$m$, D3$m$, D4$m$, D5$m$, and D6$m$ among the distances D1, D2, D3, D4, D5, and D6 that are measured a plurality of times, it is possible to reduce the distance measurements from being affected by the multipath.

Next, a process is executed to obtain an angle forming by two mutually adjacent straight lines among straight lines connecting the plurality of RF circuit parts 112, 122, 132, and 142 to each other, using the minimum values D1$m$, D2$m$, D3$m$, D4$m$, D5$m$, and D6$m$ and the law of cosines (step S107). In other words, the process is executed to obtain an angle θ1 between a straight line L1 connecting the plurality of RF circuit parts 112 and 122 to each other, and a straight line L5 connecting the plurality of RF circuit parts 112 and 132 to each other, using the minimum values D1$m$, D2$m$, and D5$m$ and the law of cosines. The process is executed to obtain an angle θ2 between the straight line L1 connecting the plurality of RF circuit parts 112 and 122 to each other, and a straight line L6 connecting the plurality of RF circuit parts 122 and 142 to each other, using the minimum values D1$m$, D4$m$, and D6$m$ and the law of cosines. The process is executed to obtain an angle θ3 between a straight line L2 connecting the plurality of RF circuit parts 122 and 132 to each other, and the straight line L6 connecting the plurality of RF circuit parts 122 and 142 to each other, using the minimum values D2$m$, D3$m$, and D6$m$ and the law of cosines. The process is executed to obtain an angle θ4 between the straight line L2 connecting the plurality of RF circuit parts 122 and 132 to each other, and the straight line L5 connecting the plurality of RF circuit parts 112 and 132 to each other, using the minimum values D1$m$, D2$m$, and D5$m$ and the law of cosines. The process is executed to obtain an angle θ5 between a straight line L3 connecting the plurality of RF circuit parts 132 and 142 to each other, and the straight line L5 connecting the plurality of RF circuit parts 112 and 132 to each other, using the minimum values D3$m$, D4$m$, and D5$m$ and the law of cosines. The process is executed to obtain an angle θ6 between the straight line L3 connecting the plurality of RF circuit parts 132 and 142 to each other, and the straight line L6 connecting the plurality of RF circuit parts 122 and 142 to each other, using the minimum values D2$m$, D3$m$, and D6$m$ and the law of cosines. The process is executed to obtain an angle θ7 between a straight line L4 connecting the plurality of RF circuit parts 112 and 142 to each other, and the straight line L6 connecting the plurality of RF circuit parts 132 and 142 to each other, using the minimum values D1$m$, D4$m$, and D6$m$ and the law of cosines. The process is executed to obtain an angle θ8 between the straight line L4 connecting the plurality of RF circuit parts 112 and 142 to each other, and the straight line L5 connecting the plurality of RF circuit parts 112 and 132 to each other, using the minimum values D3$m$, D4$m$, and D5$m$ and the law of cosines.

Next, a process is executed to judge whether an absolute value of a difference between 180 degrees, and a total angle of interior angles of a triangle formed by the straight lines connecting three RF circuit parts to each other, is less than a predetermined value (threshold value) (step S109). In other words, the process is executed to judge whether the absolute value of the difference between 180 degrees and the total angle of the interior angles θ1, θ2, θ3, and θ4 of the triangle formed by the straight lines L1, L2, and L5 connecting the three RF circuit parts 112, 122, and 132 to each other is less than the predetermined value. The process is executed to judge whether the absolute value of the difference between 180 degrees and the total angle of the interior angles θ5, θ6, θ7, and θ8 of the triangle formed by the straight lines L3, L4, and L5 connecting the three RF circuit parts 112, 132, and 142 to each other is less than the predetermined value. The process is executed to judge whether the absolute value of the difference between 180 degrees and the total angle of the interior angles θ3, θ4, θ5, and θ6 of the triangle formed by the straight lines L2, L3, and L6 connecting the three RF circuit parts 122, 132, and 142 to each other is less than the predetermined value. The process is executed to judge whether the absolute value of the difference between 180 degrees and the total angle of the interior angles θ1, θ2, θ7, and θ8 of the triangle formed by the straight lines L1, L4, and L6 connecting the three RF circuit parts 112, 122, and 142 to each other is less than the predetermined value.

In a case in which the absolute value of the difference between 180 degrees and the total angle of the interior angles of the triangle is less than the predetermined value (Yes in step S109), a process is executed to store each of the angles θ1 through θ8 and each of the minimum values D1$m$ through D6$m$ in the memory (step S111). In a case in which the absolute value of the difference between 180 degrees and the total angle of the interior angles of the triangle is greater than or equal to the predetermined value (No in step S109), the process of step S103 is executed.

In step S113 following step S111, a process is executed to increment the counter to "N=N+1" (step S113). Next, a process is executed to judge whether "N" is less than a maximum value MeasMax that is set in advance (step S115). In a case in which "N" is less than the maximum value MeasMax (Yes in step S115), a process is executed to regard each of the minimum values D1$m$ through D6$m$ as a true value of each of the distances D1 through D6 among the plurality of RF circuit parts 112, 122, 132, and 142 (step S117). Hence, it is possible to efficiently measure the distances D1, D2, D3, D4, D5, and D6 among the plurality of RF circuit parts 112, 122, 132, and 142. In addition, by using each of the angles θ1 through θ8 and each of the distances D1 through D8, it is possible to efficiently measure the position coordinates of the plurality of RF circuit parts 112, 122, 132, and 142.

Figure 4:
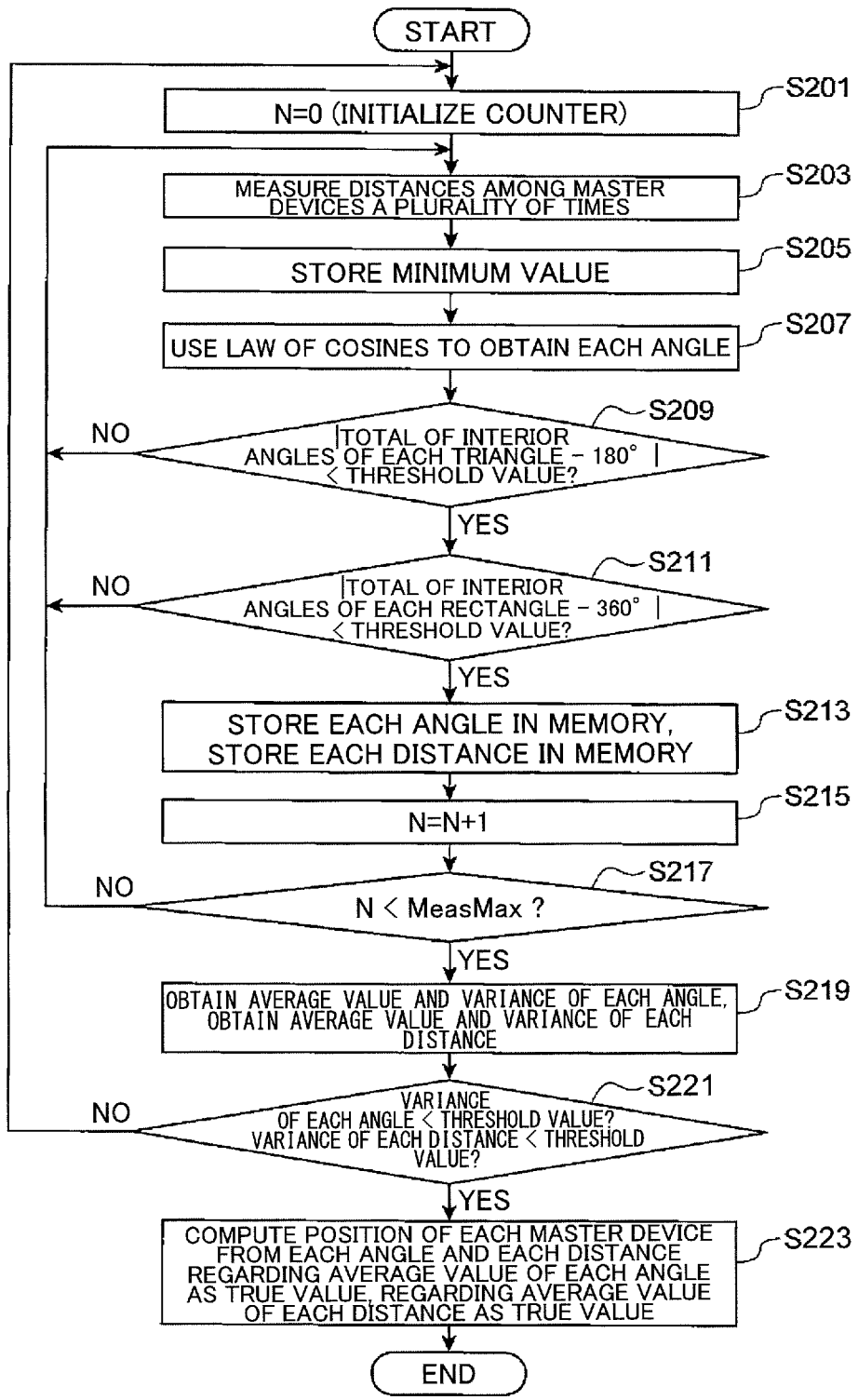
FIG. 4 is a flow chart illustrating another process executed by the position detection system in one embodiment.

FIG. 4 is a flow chart illustrating another process executed by the position detection system in one embodiment.

Processes of steps S201, S203, S205, S207, and S209 illustrated in FIG. 4 are the same as the processes of steps S101, S103, S105, S107, and S109 described above in conjunction with FIG. 3.

In step S211 following step S209, a process is executed to judge whether an absolute value of a difference between 360 degrees, and a total angle of interior angles of a rectangle formed by the straight lines connecting four RF circuit parts to each other, is less than a predetermined value (threshold value) (step S211). In other words, the process is executed to judge whether the absolute value of the difference between 360 degrees and the total angle of the interior angles θ1, θ2, θ3, θ4, θ5, θ6, θ7, and θ8 of the rectangle formed by the straight lines. L1, L2, L3, and L4 connecting the four RF circuit parts 112, 122, 132, and 142 to each other is less than the predetermined value.

Processes of steps S213, S215, and S217 are the same as the processes of steps S111, S113, and S115 described above in conjunction with FIG. 3. In addition, a processes of step S203 following step S201 is the same as the process of step S103 described above in conjunction with FIG. 3.

In step S219 following step S217, a process is executed to obtain average values θ1ave, θ2ave, θ3ave, θ4ave, θ5ave, θ6ave, θ7ave, and θ8ave of the respective angles θ1, θ2, θ3, θ4, θ5, θ6, θ7, and θ8, and to obtain variances θ1σ, θ2σ, θ3σ, θ4σ, θ5σ, θ6σ, θ7σ, and θ8σ of the respective angles θ1, θ2, θ3, θ4, θ5, θ6, θ7, and θ8 (step S219). In addition, a process is executed to obtain average values D1ave, D2ave, D3ave, D4ave, D5ave, and D6ave of the respective minimum values D1m, D2m, D3m, D4m, D5m, and D6m, and to obtain variances D1σ, D2σ, D3σ, D4σ, D5σ, and D6σ of the respective minimum values D1m, D2m, D3m, D4m, D5m, and Dm6 (step S219).

Next, a process is executed to judge whether the variances D1σ through D6σ of the respective minimum values D1m through D6m are less than a predetermined value (first predetermined value), and the variances θ1σ through θ8σ of the respective angles θ1 through θ8 are less than a predetermined value (second predetermined value) (step S221). In a case in which the variances D1σ through D6σ of the respective minimum values D1m through D6m are less than the predetermined value (first predetermined value), and the variances θ1σ through θ8σ of the respective angles θ1 through θ8 are less than a predetermined value (second predetermined value) (Yes in step S221), a process is executed to regard the average values θ1ave through θ8ave of the respective angles θ1 through θ8 as true values of the angles θ1 through θ8 (step S223). Further, in the case in which the variances D1σ through D6σ of the respective minimum values D1m through D6m are less than the predetermined value (first predetermined value), and the variances θ1σ through θ8σ of the respective angles θ1 through θ8 are less than a predetermined value (second predetermined value) (Yes in step S221), a process is executed to regard the average values D1ave through D6ave of the respective minimum values D1m through D6m as true values of the distances D1 through D6 among the plurality of RF circuit parts 112, 122, 132, and S142 (step S223).

Accordingly, it is possible to measure the distances D1, D2, D3, D4, D5, and D6 among the plurality of RF circuit parts 112, 122, 132, and 142 with a higher accuracy. In addition, by using each of the angles θ1 through θ8 that is regarded as the true value and each of the distances D1 through D8 that are regarded as the true value, it is possible to measure the position coordinates of the plurality of RF circuit parts 112, 122, 132, and 142 with a higher accuracy. Further, it is possible to obtain effects that are the same as the effects described above in conjunction with FIG. 3.

Figure 5:
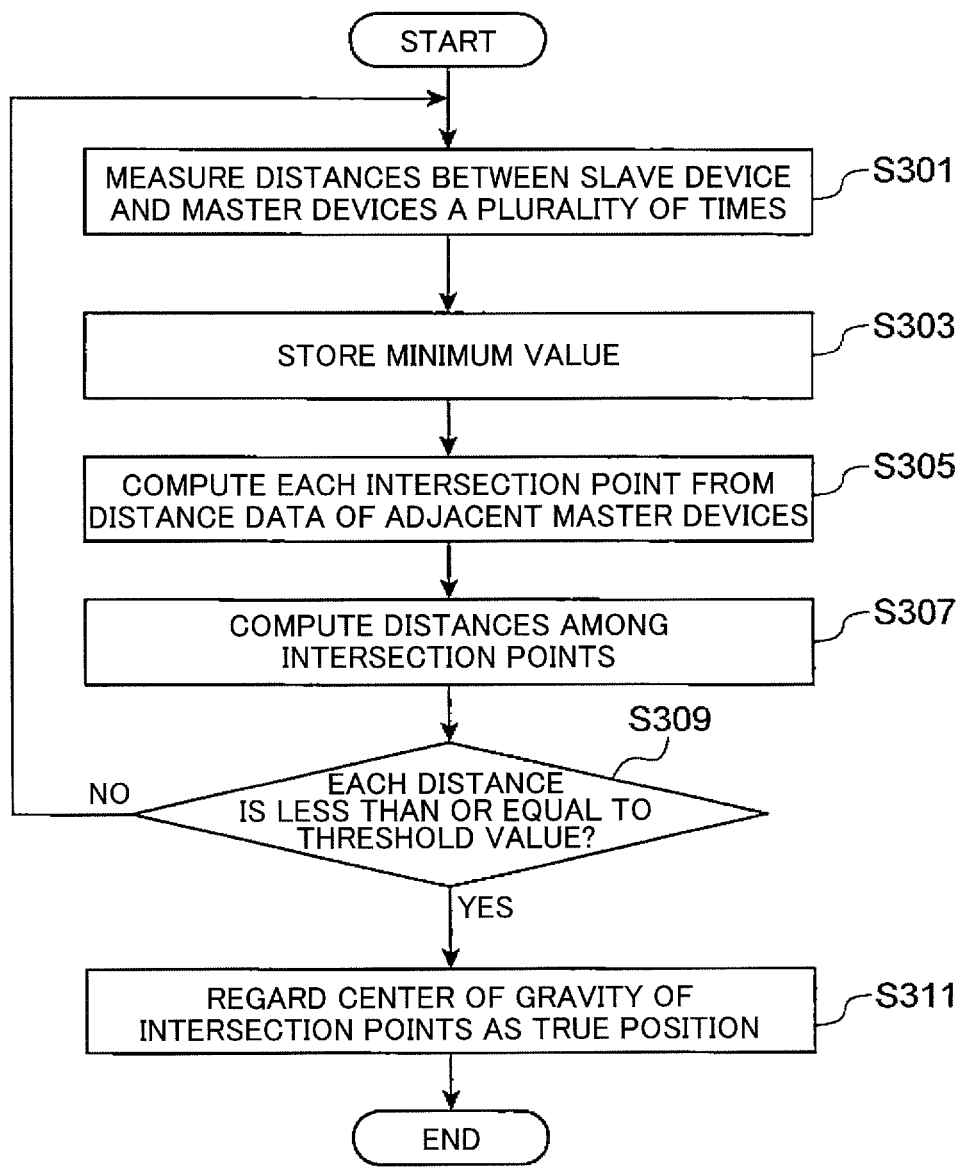
FIG. 5 is a flow chart illustrating still another process executed by the position detection system in one embodiment.

FIG. 5 is a flow chart illustrating still another process executed by the position detection system in one embodiment.

Figure 6:
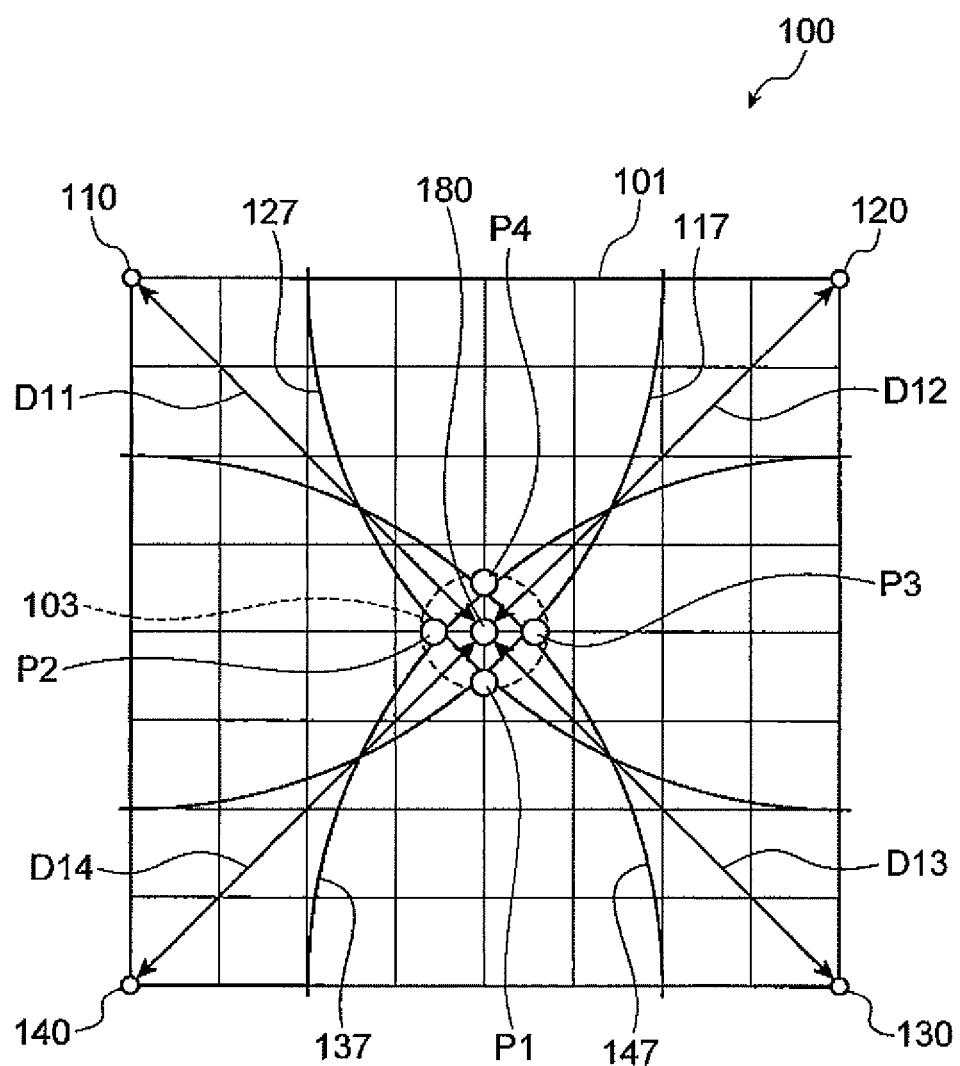
FIG. 6 is a plan view for explaining a process of measuring position coordinates of a slave device.

FIG. 6 is a plan view for explaining a process of measuring position coordinates of a slave device.

Figure 7:
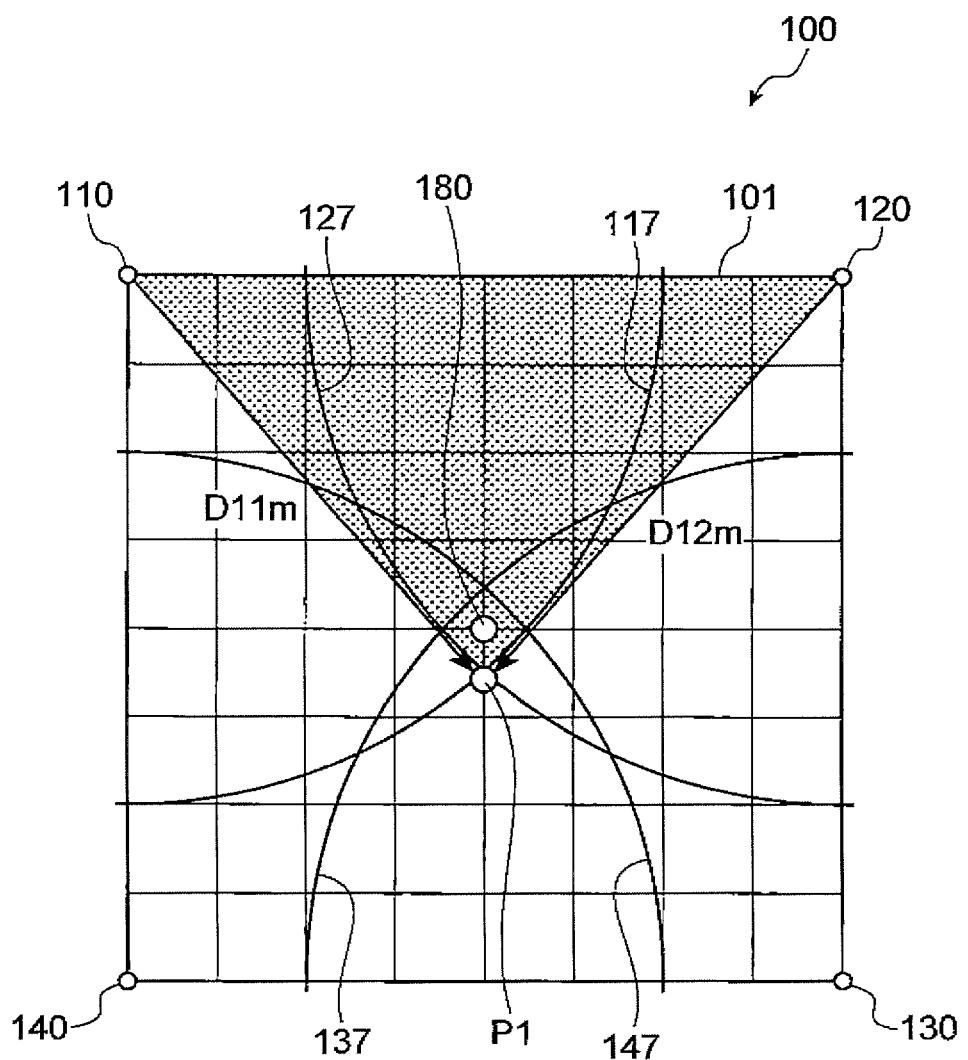
FIG. 7 is a plan view for explaining a process of obtaining a position of an intersection point P1 of two arcs.

FIG. 7 is a plan view for explaining a process of obtaining a position of an intersection point P1 of two arcs.

Figure 8:
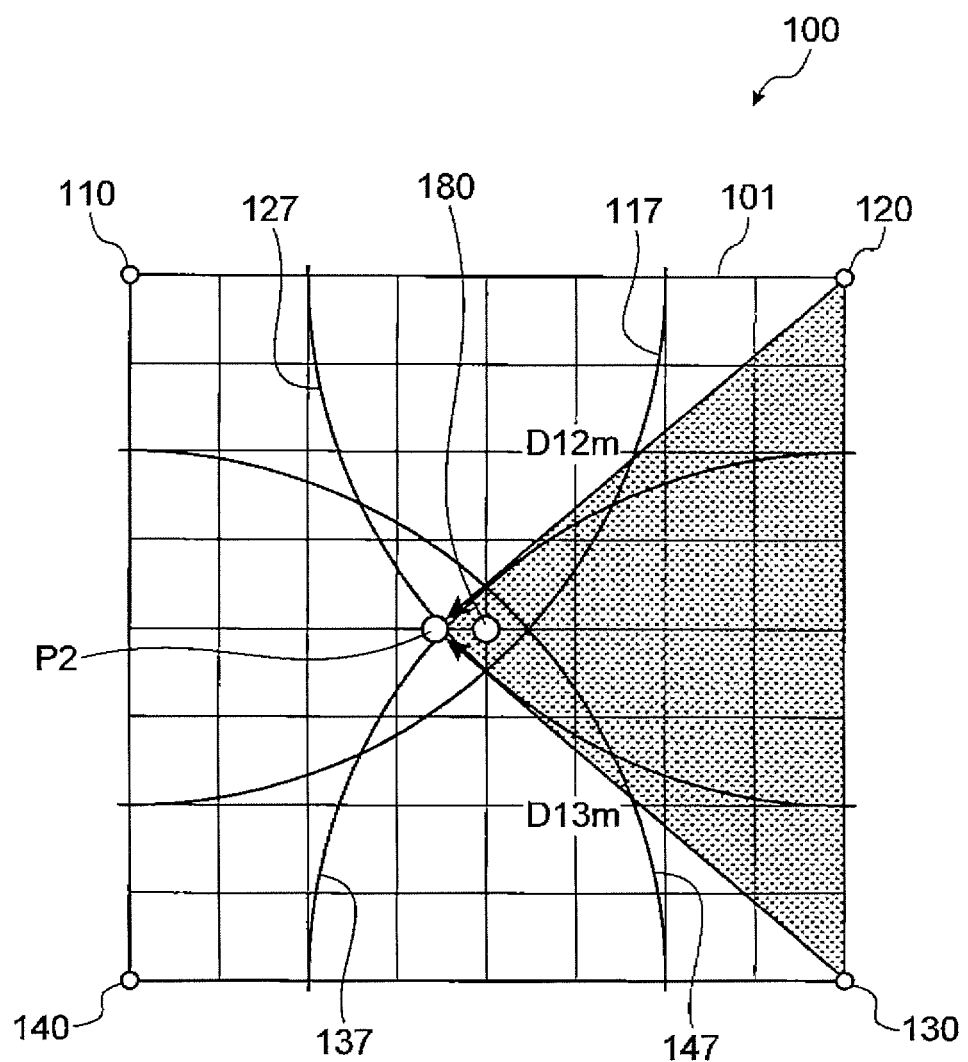
FIG. 8 is a plan view for explaining a process of obtaining a position of an intersection point P2 of two arcs.

FIG. 8 is a plan view for explaining a process of obtaining a position of an intersection point P2 of two arcs.

Figure 9:
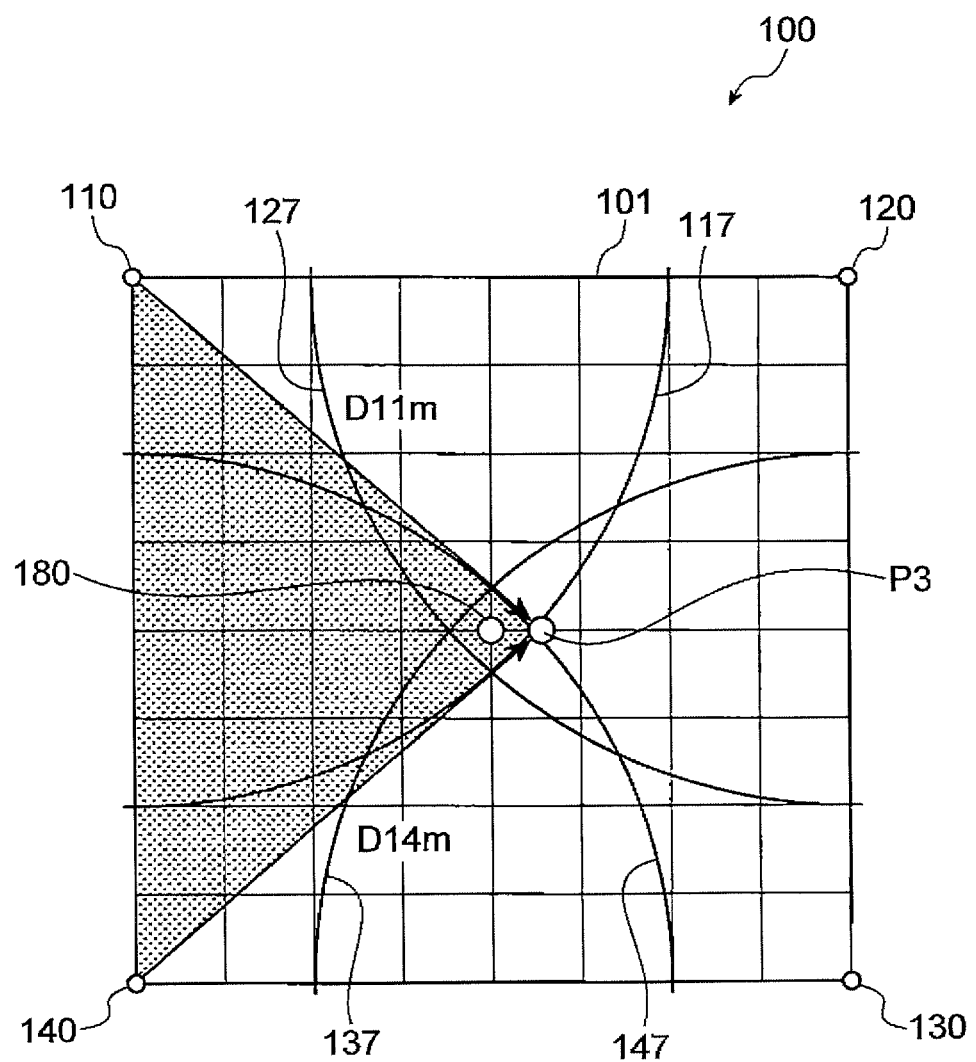
FIG. 9 is a plan view for explaining a process of obtaining a position of an intersection point P3 of two arcs.

FIG. 9 is a plan view for explaining a process of obtaining a position of an intersection point P3 of two arcs.

Figure 10:
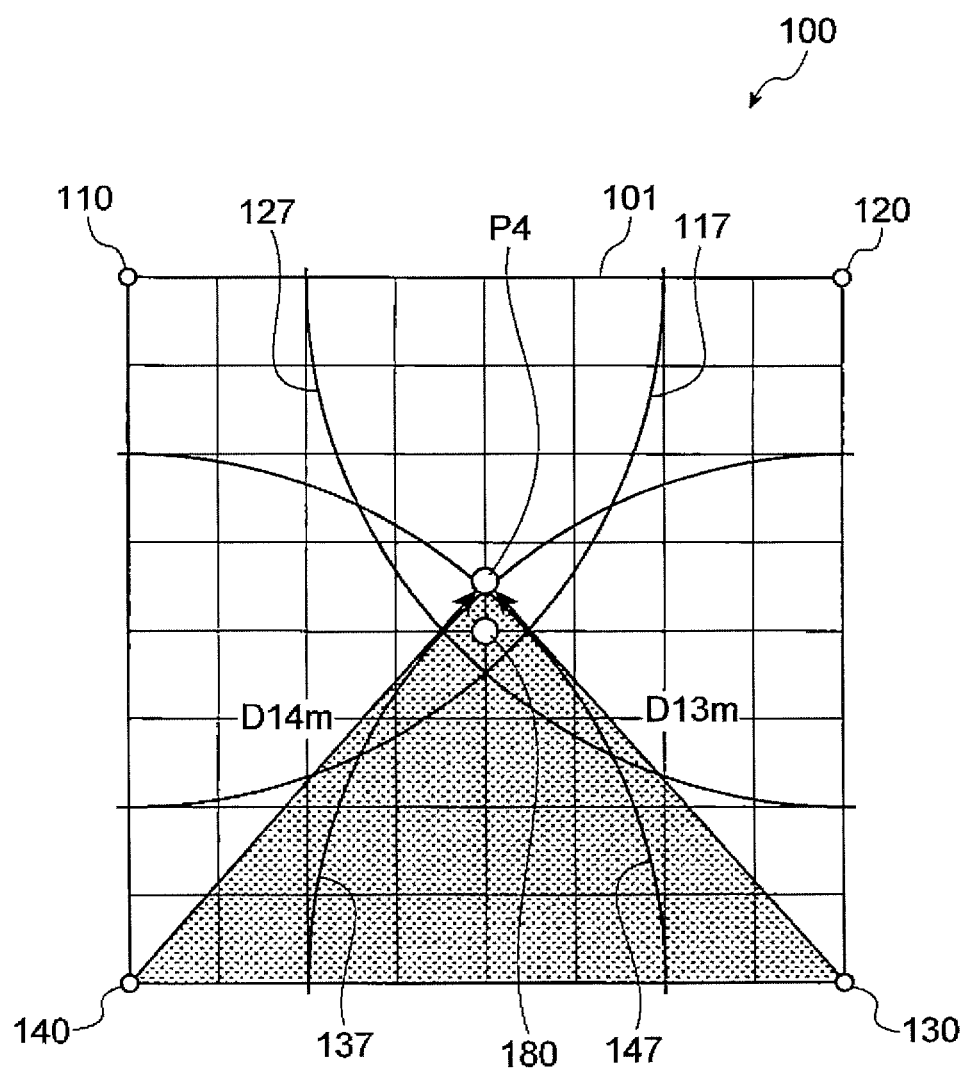
FIG. 10 is a plan view for explaining a process of obtaining a position of an intersection point P4 of two arcs.

FIG. 10 is a plan view for explaining a process of obtaining a position of an intersection point P4 of two arcs.

Figure 11:
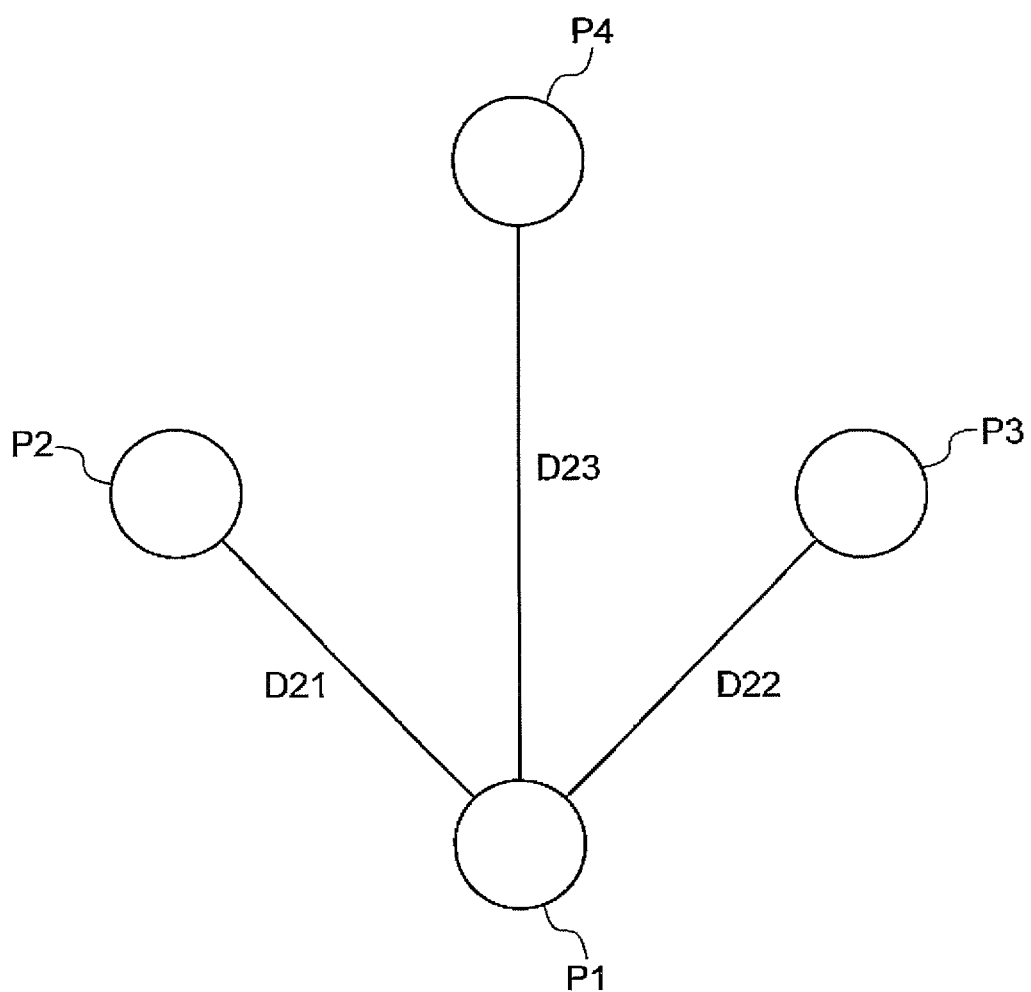
FIG. 11 is a plan view illustrating a region 103 illustrated in FIG. 6 on an enlarged scale.

FIG. 11 is a plan view illustrating a region 103 illustrated in FIG. 6 on an enlarged scale.

By executing the process described above in conjunction with FIG. 3 or FIG. 4, it is possible to efficiently measure the position coordinates of the plurality of RF circuit parts 112, 122, 132, and 142. For this reason, it is possible to thereafter measure the distance D11 between the first master device 110 and the slave device 180, the distance D12 between the second master device 120 and the slave device 180, the distance D13 between the third master device 130 and the slave device 180, and the distance D14 between the fourth master device 140 and the slave device 180, to measure the position of the slave device 180.

In this case, as described above in conjunction with FIG. 1 and FIG. 2, the position detection system 100 in this embodiment uses the RF signals to measure the distances D11, D12, D13, and D14 between the slave device 180 and each of the plurality of master devices 110, 120, 130, and 140. For this reason, the measurements of the distances D11, D12, D13, and D14 may be unaffected by the multipath. When the measurements of the distances D11, D12, D13, and D14 are unaffected by the multipath, the accuracy of measuring the distances D11, D12, D13, and D14 may deteriorate.

On the other hand, the position detection system 100 in this embodiment executes a process to obtain a plurality of arcs having the minimum values D11m, D12m, D13m, and D14m of the distances D11, D12, D13, and D14 as radii from respective centers of the plurality of master devices 110, 120, 130, and 140, and to obtain a position of intersection points of two arcs among the plurality of arcs. In a case in which the distances among a plurality of intersection points are less than or equal to a predetermined value, the process regards a position of a center of gravity of the plurality of intersection points as the true position of the slave device. In this case, when the number of intersection points of two arcs becomes one within the measurement area 101, the position of this one intersection point is obtained.

Accordingly, when the distances among the plurality of intersection points are less than or equal to the predetermined value, it may be regarded that the plurality of intersection points are densely arranged. In this case, the center of gravity of the plurality of intersection points is regarded as the true position of the slave device. Hence, even when the RF signals are used, it is possible to measure the distances D11, D12, D13, and D14 between the slave device 180 and the plurality of master devices 110, 120, 130, and 140, and the position of the slave device 180, with a high accuracy.

A further description will be given of the above described process, by referring to FIG. 5 through FIG. 11.

As illustrated in FIG. 5, a process is first executed to measure the distances between the slave device 180 and each of the plurality of master devices 110, 120, 130, and 140 a plurality of times (step S301: first process). More particularly, the RF circuit part 112 of the first master device 110 and the RF circuit part 182 of the slave device 180 measure the distance D11 therebetween a plurality of times. The RF circuit part 122 of the second master device 120 and the RF circuit part 182 of the slave device 180 measure the distance D12 therebetween a plurality of times. The RF circuit part 132 of the third master device 130 and the RF circuit part 182 of the slave device 180 measure the distance D13 therebetween a plurality of times. The RF circuit part 142 of the fourth master device 140 and the RF circuit part 182 of the slave device 180 measure the distance D14 therebetween a plurality of times.

Next, a process is executed to obtain a shortest distance (minimum value) of each of the distances D11, D12, D13, and D14 that are measured a plurality of times (step S303: first process). In other words, the process is executed to obtain a minimum value D11m among the distances D11 that are measured a plurality of times. The process is executed to obtain a minimum value D12m among the distances D12 that are measured a plurality of times. The process is executed to obtain a minimum value D13m among the distances D13 that are measured a plurality of times. The process is executed to obtain a minimum value D14m among the distances D14 that are measured a plurality of times.

Next, a process is executed to obtain an intersection point of two arcs, from distance data measured by two adjacent master devices among the plurality of master devices (step S305: second process). In other words, as illustrated in FIG. 7, the process is executed to obtain the intersection point P1 of an arc 117 having the minimum value D11$m$ as the radius from the first master device 110 that is regarded as the center, and an arc 127 having the minimum value D12$m$ as the radius from the second master device 120 that is regarded as the center. As illustrated in FIG. 8, the process is executed to obtain the intersection point P2 of the arc 127 having the minimum value D12$m$ as the radius from the second master device 120 that is regarded as the center, and an arc 137 having the minimum value D13$m$ as the radius from the third master device 130 that is regarded as the center. As illustrated in FIG. 9, the process is executed to obtain the intersection point P3 of the arc 117 having the minimum value D11$m$ as the radius from the first master device 110 that is regarded as the center, and an arc 147 having the minimum value D14$m$ as the radius from the fourth master device 140 that is regarded as the center. As illustrated in FIG. 10, the process is executed to obtain the intersection point P4 of the arc 137 having the minimum value D13$m$ as the radius from the third master device 130 that is regarded as the center, and the arc 147 having the minimum value D14$m$ as the radius from the fourth master device 140 that is regarded as the center.

Only one intersection point exists within the measurement area 101 between the arcs having the minimum values of the distances between the slave device 180 and two adjacent master devices, as the radii from the two adjacent master devices that are regarded as the centers. The process to obtain the position of the intersection point of the two arcs is executed in a case in which only one intersection point of the two arcs exists within the measurement area 101.

Next, a process is executed to obtain distances among the plurality of intersection points P1, P2, P3, and P4 (step S307). For example, as illustrated in FIG. 11, the process is executed to obtain a distance D21 between the intersection point P1 and the intersection point P2. The process is executed to obtain a distance D22 between the intersection point P1 and the intersection point P3. The process is executed to obtain a distance D23 between the intersection point P1 and the intersection point P4.

Next, a process is executed to judge whether each of the distances D21, D22, and D23 among the plurality of intersection points P1, P2, P3, and P4 is less than or equal to a predetermined value (threshold value) (step S309). In a case in which each of the distances D21, D22, and D23 is less than or equal to the predetermined value (Yes in step S309), it may be judged that the plurality of intersection points P1, P2, P3, and P4 are densely arranged. In this case, a process is executed to regard the position of the center of gravity of the plurality of intersection points P1, P2, P3, and P4 as the true position of the slave device 180 (step S311: third process). In a case in which one of the distances D21, D22, and D23 is greater than the predetermined value (No in step S309), the process of step S301 is executed.

According to this embodiment, even when the RF signals are used, it is possible to measure, with a high accuracy, the distances D11, D12, D13, and D14 between the slave device 180 and the plurality of master devices 110, 120, 130, and 140, and the position of the slave device 180.

In step S307, the distances among the plurality of intersection points P1, P2, P3, and P4 may be obtained using the intersection point P2 as a reference. In other words, a process may be executed to obtain the distance (D21) between the intersection point P2 and the intersection point P1, the distance between the intersection point P2 and the intersection point P3, and the distance between the intersection point P2 and the intersection point P4. Alternatively, the intersection point P3 may be used as a reference, to obtain the distances among the plurality of intersection points P1, P2, P3, and P4. In other words, a process may be executed to obtain the distance (D22) between the intersection point P3 and the intersection point P1, the distance between the intersection point P3 and the intersection point P2, and the distance between the intersection point P3 and the intersection point P4. Alternatively, the intersection point P4 may be used as a reference, to obtain the distances among the plurality of intersection points P1, P2, P3, and P4. In other words, a process may be executed to obtain the distance (D23) between the intersection point P4 and the intersection point P1, the distance between the intersection point P4 and the intersection point P2, and the distance between the intersection point P4 and the intersection point P3. In addition, a process may be executed in step S309 to judge whether each of the obtained distances is less than or equal to the predetermined value.

In this case, more distances are used to judge whether the plurality of intersection points P1, P2, P3, and P4 are densely arranged. For this reason, even when the RF signals are used, it is possible to measure, with a higher accuracy, the distances D11, D12, D13, and D14 between the slave device 180 and the plurality of master devices 110, 120, 130, and 140, and the position of the slave device 180.

Figure 12:
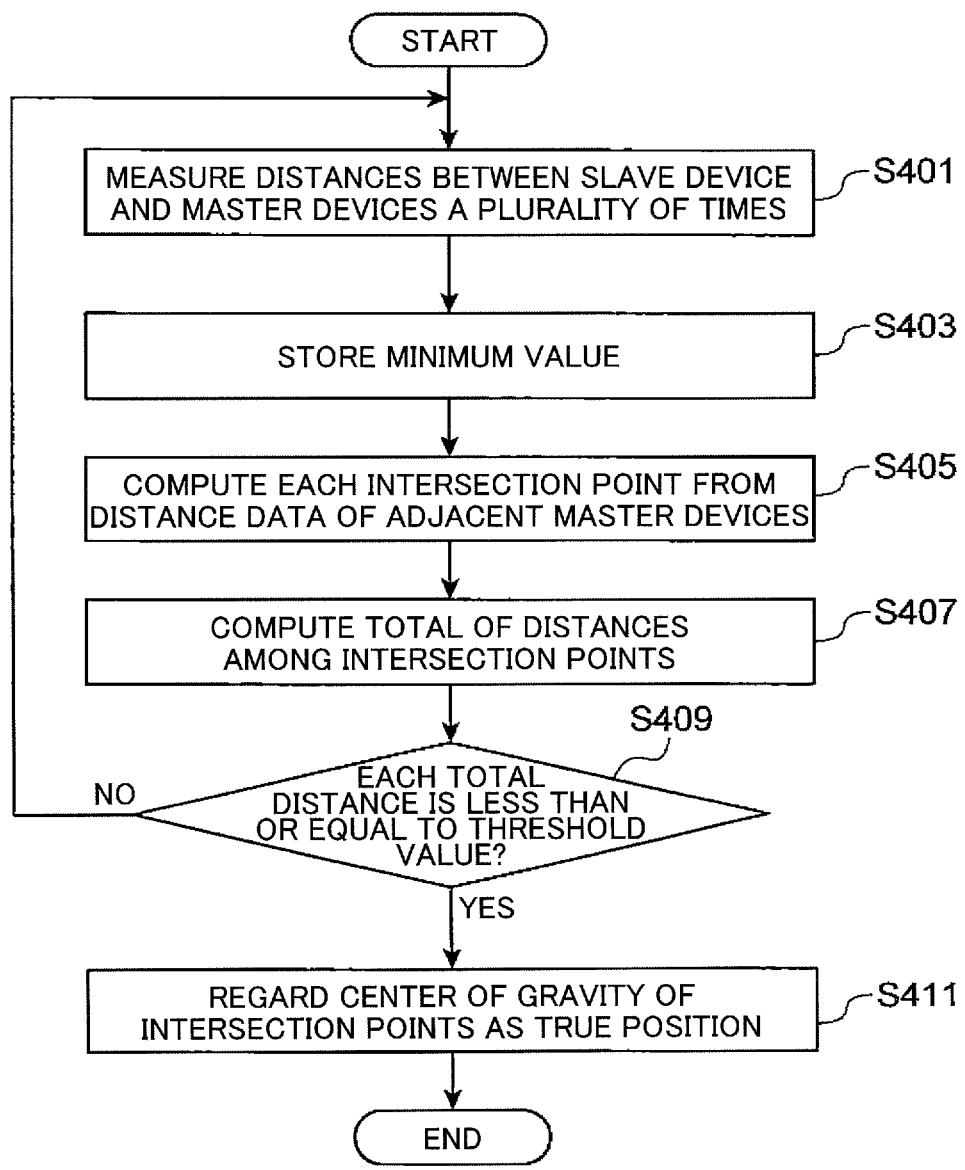
FIG. 12 is a flow chart illustrating a further process executed by the position detection system in one embodiment.

FIG. 12 is a flow chart illustrating a further process executed by the position detection system in one embodiment.

Processes of steps S401, S403, and S405 illustrated in FIG. 12 are the same as the processes of steps S301, S303, and S305 described above in conjunction with FIG. 5.

In step S407 following step S405, a process is executed to obtain a total value S1 of the distances D21, D22, and D23 among the plurality of intersection points P1, P2, P3, and P4 (step S407). Next, a process is executed to judge whether the total value S1 of the distances D21, D22, and D23 among the plurality of intersection points P1, P2, P3, and P4 is less than or equal to a predetermined value (threshold value) (step S409).

In a case in which the total value S1 is less than or equal to the predetermined value (Yes in step S409), it may be judged that the plurality of intersection points P1, P2, P3, and P4 are densely arranged. In this case, a process is executed to regard the center of gravity of the plurality of intersection points P1, P2, P3, and P4 as the true position of the slave device 180 (step S411: third process). In a case in which the total value S1 is greater than the predetermined value (No in step S409), the process of step S401 is executed.

According to this embodiment, the total value S1 of the distances D21, D22, and D23 among the plurality of intersection points P1, P2, P3, and P4 is used to judge whether the plurality of intersection points P1, P2, P3, and P4 are densely arranged. For this reason, even when the RF signals are used, it is possible to measure, with a higher accuracy, the distances D11, D12, D13, and D14 between the slave device 180 and the plurality of master devices 110, 120, 130, and 140, and the position of the slave device 180.

In step S407, a total value S2 of the distances among the plurality of intersection points P1, P2, P3, and P4 may be obtained using the intersection point P2 as a reference. In other words, a process may be executed to obtain the distance (D21) between the intersection point P2 and the intersection point P1, the distance between the intersection point P2 and the intersection point P3, and the distance between the intersection point P2 and the intersection point P4, to obtain the total value S2 of these distances that are obtained. Alternatively, a total value S3 of the distances among the plurality of intersection points P1, P2, P3, and P4 may be obtained using the intersection point P3 as a reference. In other words, a process may be executed to obtain the distance (D22) between the intersection point P3 and the intersection point P1, the distance between the intersection point P3 and the intersection point P2, and the distance between the intersection point P3 and the intersection point P4, to obtain the total value S3 of these distances that are obtained. Alternatively, a total value S4 of the distances among the plurality of intersection points P1, P2, P3, and P4 may be obtained using the intersection point P4 as a reference. In other words, a process may be executed to obtain the distance (D23) between the intersection point P4 and the intersection point P1, the distance between the intersection point P4 and the intersection point P2, and the distance between the intersection point P4 and the intersection point P3, to obtain the total value S3 of these distances that are obtained. In addition, a process may be executed in step S409 to judge whether each of the obtained total values S1, S2, S3, and S4 is less than or equal to the predetermined value.

In this case, the plurality of total values S1, S2, S3, and S4 are used to judge whether the plurality of intersection points P1, P2, P3, and P4 are densely arranged. For this reason, even when the RF signals are used, it is possible to measure, with a higher accuracy, the distances D11, D12, D13, and D14 between the slave device 180 and the plurality of master devices 110, 120, 130, and 140, and the position of the slave device 180.

Alternatively, in step S409, a process may be executed to judge whether a maximum value of the distances D21, D22, and D23 among the plurality of intersection points P1, P2, P3, and P4 is less than or equal to a predetermined value. In other words, instead of using the total value of the distances among the plurality of intersection points P1, P2, P3, and P4, the maximum value of the distances D21, D22, and D23 among the plurality of intersection points P1, P2, P3, and P4 is used to judge whether the plurality of intersection points P1, P2, P3, and P4 are densely arranged. In this case, it is possible to judge, with a higher accuracy, whether the plurality of intersection points P1, P2, P3, and P4 are densely arranged.

Although the embodiments and applications thereof are described above, the present invention is not limited to these examples. For example, in each of the embodiments and each of the applications thereof, those skilled in the art may add, delete, or make design modifications to the constituent elements, where appropriate, without departing from the scope of the subject matter of the present invention. In addition features of each of the embodiments may be combined, where appropriate, without departing from the scope of the subject matter of the present invention.

What is claimed is:

1. A position detection system comprising:
a plurality of master devices surrounding a measurement area; and
a slave device located inside the measurement area,
wherein the plurality of master devices measure a position of the slave device using high-frequency signals, by executing a process including:
a first process that measures distances between the slave device and each of the plurality of master devices a plurality of times, to obtain a minimum value of each of the distances;
a second process that obtains a position of an intersection point of two arcs among a plurality of arcs respectively having the minimum value of each of the distances as a radius from respective centers of the plurality of master devices when a number of intersection points of the two arcs within the measurement area is one; and
a third process that regards a center of gravity of a plurality of intersection points as a true position of the slave device when the plurality of intersection points are densely arranged and distances among the plurality of intersection points are less than a predetermined value,
wherein the second process obtains a position of one intersection point when two adjacent master devices are regarded as centers and only the one intersection point exists within the measurement area between arcs having, as radii from the two adjacent master devices that are regarded as the centers, minimum values of distances between the slave device and the two adjacent master devices.

2. The position detection system as claimed in claim 1, wherein the third process regards the center of gravity of the plurality of intersection points as the true position of the slave device when the plurality of intersection points are densely arranged and a total value of the distances among the plurality of intersection points is less than a predetermined value.

3. The position detection system as claimed in claim 1, wherein the third process regards the center of gravity of the plurality of intersection points as the true position of the slave device when the plurality of intersection points are densely arranged and a maximum value of the distances among the plurality of intersection points is less than a predetermined value.

4. The position detection system as claimed in claim 1, wherein the plurality of master devices execute the process further including:
a fourth process that measures distances among the plurality of master devices, to measure respective position coordinates of the plurality of master devices,
wherein the first process measures the distances between the slave device and each of the plurality of master devices using the position coordinates of the plurality of master devices.

5. The position detection system as claimed in claim 4, wherein the first process measures the distances between the slave device and each of the plurality of master devices by transmitting the high-frequency signals from the plurality of master devices to the slave device, and receiving by the plurality of master devices response signals from the slave device in response to the high-frequency signals.

6. The position detection system as claimed in claim 5, wherein each of the plurality of master devices includes
a memory configured to store one or more programs;
a transmitter and receiver configured to transmit the high-frequency signals and receive the response signals; and
a processor configured to execute the one or more programs and perform a process that includes controlling transmission and reception of the transmitter and receiver, wherein the first, second, third, and fourth processes are executed by processors of the plurality of master devices.

7. The position detection system as claimed in claim 1, wherein the plurality of master devices execute the process further including:
a fourth process that measures distances among the plurality of master devices, to measure respective position coordinates of the plurality of master devices,
wherein the third process judges whether a total value of the distances among the plurality of intersection points is less than or equal to a threshold value, and judges that the plurality of intersection points are densely arranged when the total value is less than or equal to the threshold value.

8. The position detection system as claimed in claim 7, wherein the first, second, third, and fourth processes are executed by processors of the plurality of master devices.

\* \* \* \* \*